United States Patent
Ouzieli

(10) Patent No.: US 8,606,109 B2
(45) Date of Patent: Dec. 10, 2013

(54) TECHNIQUE FOR FORWARDING PACKETS IN A GIGABIT PASSIVE OPTICAL NETWORK (GPON)

(75) Inventor: Ido Ouzieli, Tel-Aviv (IL)

(73) Assignee: ECI Telecom Ltd, Petach Tikva (IL)

( * ) Notice: Subject to any disclaimer, the term of this patent is extended or adjusted under 35 U.S.C. 154(b) by 682 days.

(21) Appl. No.: 12/679,855

(22) PCT Filed: Sep. 22, 2008

(86) PCT No.: PCT/IL2008/001267
§ 371 (c)(1),
(2), (4) Date: Mar. 24, 2010

(87) PCT Pub. No.: WO2009/040795
PCT Pub. Date: Apr. 2, 2009

(65) Prior Publication Data
US 2010/0209104 A1    Aug. 19, 2010

(30) Foreign Application Priority Data
Sep. 24, 2007  (IL) .......................... 186239

(51) Int. Cl.
*H04J 14/08*   (2006.01)
(52) U.S. Cl.
USPC .......... 398/100; 398/66; 398/67; 398/68; 398/70; 398/71; 398/72; 398/58; 398/98; 398/99; 370/392; 370/468; 370/389; 370/352; 370/395.53
(58) Field of Classification Search
USPC ........... 398/66, 67, 68, 69, 70, 71, 72, 98, 99, 398/100, 58, 75, 79, 89, 135, 136, 168; 370/338, 389, 392, 466, 352, 400, 370/395.53, 395.51, 401, 498, 432, 474, 370/395.1
See application file for complete search history.

(56) References Cited

U.S. PATENT DOCUMENTS

| | | | |
|---|---|---|---|
| 6,967,949 B2 | 11/2005 | Davis et al. | |
| 7,450,551 B2 * | 11/2008 | Lim et al. | 370/338 |
| 7,630,637 B2 * | 12/2009 | Mizutani et al. | 398/67 |
| 7,852,880 B2 * | 12/2010 | Solomon et al. | 370/498 |
| 8,107,415 B2 * | 1/2012 | Xiong et al. | 370/328 |

FOREIGN PATENT DOCUMENTS

EP    1499155 A1    1/2005

OTHER PUBLICATIONS

"Technical Report, DSL Forum TR-101, Migration to Ethernet-Based DSL Aggregation," Architecture and Transport Working Group, 2006, pp. 1-101, http://www.dslforum.org/techwork/tr/TR-101.pdf.
International Telecommunication Union (ITU-T G.984.1), "Series G: Transmission systems and media digital systems and networks; Digital sections and digital line system-Optical line systems for local and access networks," 2008.

* cited by examiner

*Primary Examiner* — Hanh Phan
(74) *Attorney, Agent, or Firm* — Browdy and Neimark, PLLC

(57) ABSTRACT

A technique for forwarding downstream packets in a GPON comprising an OLT unit having a physical PON port connected to N Optical Network Termination (ONT) units by optical fibers. The physical PON port accommodates N individual virtual GEM ports terminated with the N ONT units (ONTs) which form N:1 service. The technique comprises assigning in the physical port of the OLT unit a virtual GEM port being a shared broadcast GEM port terminated with all the N ONTs of the N:1 service. Those downstream packets applied to the physical PON port, which would otherwise be flooded—such as broadcast packets or packets having unknown destination address—will now be forwarded only via the shared broadcast GEM port.

13 Claims, 1 Drawing Sheet

TECHNIQUE FOR FORWARDING PACKETS IN A GIGABIT PASSIVE OPTICAL NETWORK (GPON)

FIELD OF THE INVENTION

The invention relates to a technique for economic routing of packets in Passive Optical Networks (PON), especially in a Gigabit PON network. More specifically, the technique solves a problem of forwarding broadcast packets and packets which have unknown destination addresses.

BACKGROUND OF THE INVENTION

A passive optical network (PON) is a point-to-multipoint, fiber to the premises network architecture in which unpowered optical splitters are used to enable a single optical fiber to serve multiple premises. A PON consists of an Optical Line Termination (OLT) at the service provider's central office and a number of Optical Network Units (ONUs) also called Optical Network Terminals (ONTs) near end users. A PON configuration reduces the amount of fiber and central office equipment required, in comparison with point to point architectures. Downstream signals are broadcast to each premises sharing one and the same fiber. Upstream signals are combined using a multiple access protocol, invariably time division multiple access (TDMA). The OLTs "range" the ONUs in order to provide time slot assignments for upstream communication.

At least the following PON versions are widely known in the prior art: ATM PON (APON), Broadband PON (BPON), Ethernet PON (EPON).

The ITU-T G.984 (GPON) standard for a Gigabit PON is an evolution of the Broadband PON standard (BPON). GPON supports higher rates, enhanced security, total bandwidth and bandwidth efficiency and also choice of Layer 2 protocol (ATM, GEM, Ethernet) through the use of larger, variable-length packets. The standards permit several choices of bit rate, but the industry has converged on 2,488 Mbits per second (Mbit/s) of downstream bandwidth, and 1,244 Mbit/s of upstream bandwidth. The GPON Encapsulation Method (GEM) allows very efficient packaging of user traffic, which is a unique feature of GPON.

Treatment of so-called N:1 flows in access networks is defined in the DSL Forum TR101 [http://www.dslforum.org/techwork/tr/TR-101.pdf]. N:1 flows are understood as flows that belong to a single service and are forwarded from a single central unit such as DSLAM, OLT, etc. to N subscriber end devices such as CPEs, ONTs, etc. (the N:1 service may be, for example, a voice service, a video service, a digital service, etc.). According to the above approach, all ingress packets in OLT that belong to N:1 flows, are forwarded to the relevant port of the OLT (DSLAM, etc.) based on the information that was already learned and updated in a Forwarding Information Base (FIB) of the OLT (DSLAM). The FIB information associates the packet's VLAN-ID (ID in a Virtual Local Area Network) and a Destination MAC address (Media Access Control address) with the relevant Port of OLT (DSLAM).

In the GPON case, a Port of OLT is understood as a combination of a physical PON port and the matching GEM port ID, wherein a GEM port ID indicates a specific ONT associated with the specific physical PON port and being a member in an N:1 service group that comprises N end users.

Unlike in a regular DSL case where the OLT port constitutes a physical DSL port, in the GPON case the GEM port ID is a virtual port, and several such virtual ports can reside in the same physical PON port.

In access networks, treatment of packets with unknown destination is usually organized as follows. In case the packet's combination of VLAN-ID+Destination MAC is not included in the FIB table (i.e., it has not been learned yet), that packet of the downstream flow is forwarded/flooded to all the ports. Actually, packets with unknown destination can be understood and handled as broadcast packets.

In a regular DSL case, a packet with unknown destination will be flooded (broadcast) to all relevant DSL ports, and then to all respective CPEs that are members in a specific N:1 service.

In a regular GPON case, a packet with unknown destination arriving to a physical port connected to its associated optical network (PON), will be flooded (broadcast) to all relevant GEM port IDs (i.e., to all ONTs, CPEs, MAC bridge ports, etc. that are members in the relevant N:1 service). According to that conventional solution, the packet will be transported N times per PON (where N is the number, of relevant GEM ports, and also the number of respective ONTs being members in that N:1 service). The described arrangement is shown in FIG. 1 (prior art). Note that a packet issued for any specific GEM port will reach all ONTs etc. connected to the physical port due to the broadcast nature of the PON. However, each virtual GEM port will be terminated (i.e., the forwarded packets will be accepted) by only one member in the ONT which is the required destination for a packet sent from that GEM.

Naturally, the above-described arrangement results in a significant bandwidth (BW) loss in the case of unknown packet destination, since all GEM ports carry the same flooded information.

The problem of reducing BW loss and reducing the amount of flooded packets in PONS is being studied in the prior art.

U.S. Pat. No. 6,967,949 describes a technique for forwarding packets in an Ethernet Passive Optical Network (EPON). The OLT unit in an EPON network may flood a packet with an unknown MAC destination address to all user-side ports within a given broadcast domain. If such a flooding is to be done, it will be performed via all individual user-side OLT ports belonging to the broadcast domain i.e., in a way similar to the regular DSL case.

Since GPON does not have the Ethernet physical layer, but uses the GPON Encapsulation Method instead, the described EPON solution is not applicable to GPON.

OBJECT AND SUMMARY OF THE INVENTION

It is therefore the object of the present invention to improve the GPON's efficiency in case of unknown destination when forwarding packets of N:1 service.

The following vocabulary will help understanding the proposed description and claims:

GPON—is a Gigabit Passive Optical Network;
OLT—is an Optical Line. Termination unit; OLT is usually provided with a number of physical PON ports for communicating with the PON network.
ONT—is an Optical Network Termination unit (usually associated with a specific end user) and used as a generalized term for a CPE; MAC Bridge port etc., terminating a VLAN in N:1 service;
GEM port—a virtual port for performing the GPON Encapsulation Method when forwarding packets between OLT and ONT;
FIB—Forwarding Information Base (table) of an OLT;
"a GEM port terminated with an ONT"—packets sent via that GEM port are accepted (not dropped) at that ONT.

The above object can be achieved by a method of forwarding downstream packets in a GPON comprising an OLT unit having a physical PON port connected to N Optical Network Termination (ONT) units by optical fibers, while said physical PON port accommodates N individual virtual GEM ports respectively terminated with said N ONT units (ONTs) forming an N:1 service;

the method comprises:
assigning in said physical port of the OLT unit a virtual GEM port being a broadcast virtual GEM port terminated with and shared by all said N ONTs, and
forwarding packets having unknown destination address and/or broadcast packets downstream from said physical PON port only via said shared, broadcast virtual GEM port (instead of via said N individual virtual GEM ports).

The method is preferably utilized for cases where said N ONT units form a group for a specific type of service (for example, N:1 service for voice packets, N:1 service for video packets, etc.); in this case the shared/broadcast virtual GEM port is preferably provided for that type of service (i.e., one shared virtual GEM port per specific N:1 service while not precluded to be used for more than one N:1 service groups).

The term "terminated with and shared by all said N ONTs" should be understood so that each of the N ONTs will be adapted not to reject downstream packets when they are forwarded from the shared broadcast GEM of the corresponding physical PON port. It goes without saying that each specific ONT will keep accepting downstream packets forwarded to it from the individual corresponding GEM port.

The step of providing said shared broadcast virtual GEM port comprises ensuring termination of the downstream packets, forwarded via it, at any one of said N ONT units. Preferably, it is performed by indicating the shared (broadcast) GEM port ID in the overhead portion of each "unknown" packet to be forwarded, and configuring each of the N ONT units not to drop packets having the indication of the shared (broadcast) GEM port ID.

It should be kept in mind that each of said N ONT units is associated with its individual GEM port, and in cases where a packet destination address is known to OLT, the packet is forwarded via the individual GEM port. Physically it means that ID of that individual GEM port is indicated in the overhead portion of the packet issued to the PON; from the physical PON port; such a packet arrives to all N ONTs, but is not rejected only at the ONT terminating that GEM port.

In the arrangement proposed in the present invention, each of said N ONT units will not drop packets having either the indication of its individual GEM port ID, or the indication of the shared (broadcast) GEM port ID. If any of the N ONT units also belongs to another N:1 service delivered via the same physical port (in case the service groups overlap), such ONT unit might be adapted to recognize yet an additional broadcast GEM port ID of that other N:1 service.

It should be noted that the above-proposed method allows spending N-times less bandwidth in the PON connected to the physical PON port, since the method ensures achieving the goal, while preventing the N-fold forwarding of, one and the same packet with unknown destination via all the N individual GEM ports of the OLT.

Normally, the OLT unit has a plurality of physical PON ports, each accommodating a group of virtual GEM ports associated with a respective group of ONT units in the PON. The proposed method applies to each of such physical PON ports. The groups of ONTs, connected to different physical ports, do not overlap.

Preferably, the term "unknown destination address" should be understood as a combination of VLAN-ID+Destination MAC address in access networks served by ONTs, which combination is not yet included in a FIB table of the OLT unit (i.e., an unlearned unicast address).

Further preferably, the method comprises forwarding all packets to be incidentally broadcast (those downstream packets applied to the physical PON port, which would otherwise be flooded to all its virtual ports) only via the shared, broadcast. GEM port of the OLT. Such packets may comprise ARP and/or Broadcast or Multicast MAC address type downstream packets (The ARP is Address Resolution Protocol intended for serving all packets coming without destination).

According to a second aspect of the invention, there is also provided an OLT unit designed for communication with a plurality of ONT units via optical fibers in a GPON;

the OLT comprising at least one physical PON port where N individual virtual GEM ports are configured for communicating packets between the OLT and N respective ONT units out of said plurality, forming an N:1 service, and
a broadcast virtual GEM port is configured at said physical PON port, said broadcast GEM port terminating with and being shared by all said N ONT units;
said physical PON port being adapted for downstream forwarding of packets with unknown destination addresses and/or broadcast packets only via said shared GEM port.

According to one embodiment of the above OLT unit, the shared broadcast virtual GEM port is provided for a specific type of service to be delivered to said N ONT units (i.e., one shared virtual GEM port per N:1 service group formed by the N ONT units, though one shared GEM port may serve a number of N:1 services).

In practice, a unique GEM port ID that is agreed to be recognized by all said N ONTs will indicate the shared virtual GEM port.

The above-described OLT unit should be provided with a hardware/software means or module for configuring at least one said broadcast GEM port in at least one said physical PON port, and for forwarding downstream packets with unknown destination addresses and/or broadcast packets applied by the OLT unit to said physical PON port, only via the broadcast GEM port.

According to a third aspect of the present invention, there is provided a hardware and/or software module suitable for being accommodated in an OLT unit of a GPON network, the module being adapted
to configure a shared (broadcast) virtual GEM port at a physical PON port of the OLT unit for N:1 service;
to ensure downstream forwarding of packets with unknown destination addresses and/or broadcast packets, whenever applied by said OLT unit to said physical PON port, only via said shared GEM port.

Preferably, the hardware and/or software module is adapted for forwarding downstream any incidentally broadcast packets, including ARP and Broadcast packets, via said broadcast GEM port(s) of the OLT.

The module may be in the form of an ASIC and may either be a pre-manufactured add-on product, or form an integral part of the OLT unit.

According to yet a further aspect of the invention, there is provided a software product comprising software implementable instructions and/or data for carrying out the method as described above.

The software product can be placed on any suitable carrier medium. The software product (either as is, or being downloaded to the carrier medium) constitutes a novel product, which is to be protected by the present patent application in addition to the method, the OLT unit and the hardware/software module.

BRIEF DESCRIPTION OF THE DRAWINGS

The invention will be further described and illustrated with reference to the following non-limiting drawings in which.

DETAILED DESCRIPTION OF THE DRAWINGS

Figure 1:
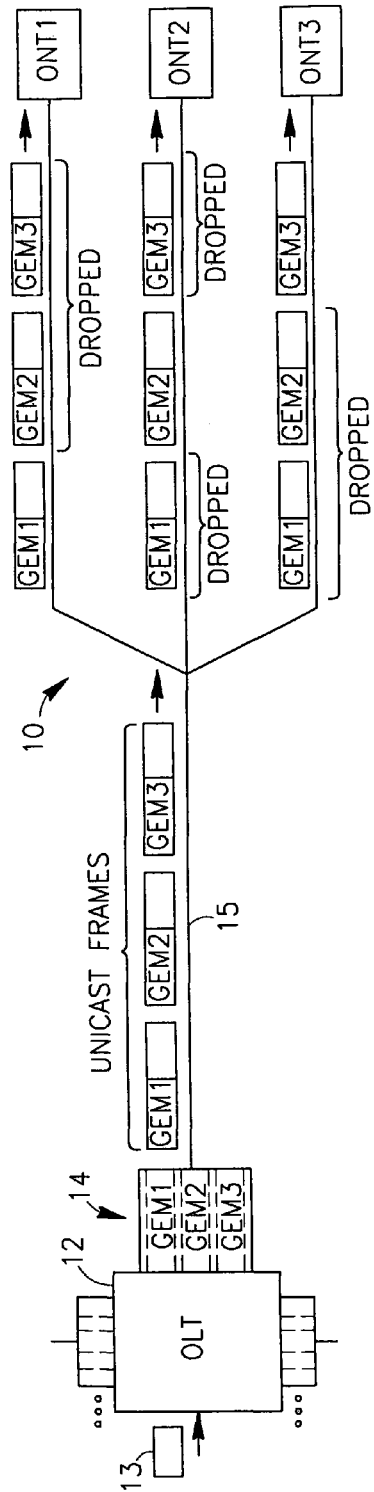
FIG. 1 (prior art) schematically illustrates the presently accepted method of forwarding downstream packets in GPON networks.

FIG. 1 (prior art) was briefly referred to in the background description. FIG. 1 illustrates a schematic GPON section 10 comprising an OLT 12 connected via an optical fiber to at least three ONT units ONT1, ONT2, ONT3, all being members of some N:1 service (say, for delivering voice packets to the group of end users, where N=3). The ONT units are connected to one or more virtual local access networks VLANs (not shown). The OLT 12 is provided with a number of physical PON ports, one of them is marked 14. In the physical PON port 14, three dedicated (individual) virtual GEM ports are configured, schematically marked by dotted boxes GEM1, GEM2 and GEM3; one GEM port per ONT. Other physical PON ports are shown as additional boxes similar to the box 14. The individual GEM ports are configured for transmitting the N:1 service flows (downstream and upstream) based on a target ONT/destination. In other words, each of the individual GEM ports is responsible for communicating with its associated specific ONT (i.e., terminated with its specific ONT). According to recommendations of the DSL Forum TR101, in case an unknown destination packet 13 is received at such an OLT, it will be flooded. Packet 13 may be, for example, of a broadcast MAC address type, or may have an unlearned unicast address. Any way, the packet 13 will be first flooded to all physical PON ports of the OLT and then, at the illustrated specific physical port 14, will be flooded to all virtual GEM ports relevant to the service, i.e. to the three mentioned individual GEM ports. As a result, the packet 13 will be transmitted separately over each one of the three individual GEM ports and will be launched on the optical fiber 15 as three separate unicast frames each bearing in its overhead portion an indication of the issuing GEM port (GEM1, GEM2 or GEM3), so as to be accepted by its corresponding ONT unit.

Owing to the nature of GPON, each of the three unicast packets arrives not only to the ONT associated with its individual GEM port, but to all other ONTs.

Finally, each one of the ONTs recognizes and accepts only the packet intended for it. Other packets will be dropped as stranger packets.

Therefore, the flooding becomes extremely excessive from the point of required bandwidth (BW).

Figure 2:
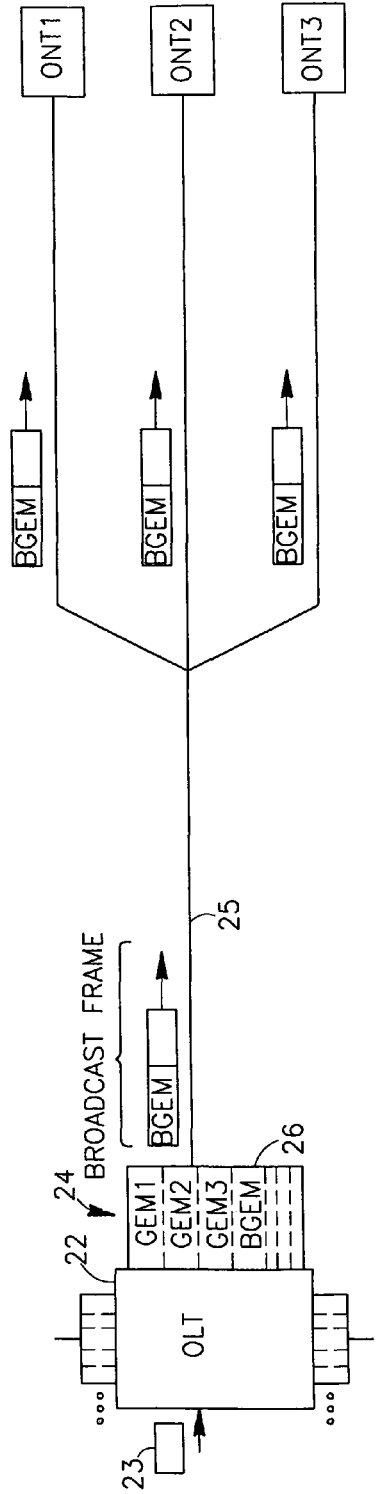
FIG. 2 schematically illustrates the newly proposed method and the newly proposed enhancement in the OLT unit for a GPON network.

FIG. 2 schematically illustrates the proposed arrangement. The Inventor proposes configuring in at least one physical PON port 24 of OLT 22 at least one virtual Broadcast (or Shared) GEM Port BGEM 26 (for example, for some N:1 service). In other words, per each group of N ONTs (N=3 in this example), associated with that physical port; there will be provided a broadcast virtual GEM port in addition to the individual GEM ports of the respective ONTs. Those individual GEM ports are shown in FIG. 2 as GEM1, GEM2, GEM3. However, a physical PON port 24 may be connected to much more ONTs forming additional N:1 service groups, the physical port may thus accommodate much more individual GEM ports. Suitable additional broadcast ports may also be provided.

In this specific example, all packets belonging to so-called incidental broadcast traffic (e.g., packets with unknown destination carrying the combination of VLAN-ID+Destination MAC not yet included in the FIB table of the OLT 22; Broadcast packets, etc.) will be forwarded to the suitable broadcast GEM ports of the physical PON ports of OLT 22. In the illustrated example, an "unknown destination" packet 23 received by OLT 22 is forwarded to the BGEM 26 (no flooding is performed via the individual GEM ports).

As a result, the packet is launched on a fiber 25 only once as a broadcast frame, over the broadcast GEM port 26; the packet now carries indication of the BGEM 26. Due to the topology of the GPON network, that packet arrives to all ONTs. However, since the broadcast GEM port 26 is terminated by all ONTs that are members in the N:1 service (in this case—ONT1, ONT2, ONT3), each of the ONTs is expected to accept that packet. BGEM 26 acts as a shared, downstream only GEM port.

As can be seen in comparison with FIG. 1, the same functionality as flooding has been achieved, but with a major BW efficiency.

Since all ARP & Broadcast packets are transmitted with an unknown destination MAC address (the destination MAC address is set to "0xFFF"), and since such packets should be forwarded/flooded to all the ONTs, the Inventor proposes that such packets be treated in the similar manner. In other words, the same solution as for the unknown N:1 destination case is suggested, and the ARP& Broadcast packets can be forwarded via the broadcast GEM port without even checking their MAC la address by the software/hardware means of the OLT.

The OLT is preferably provided with a software/hardware module, for example in the form of an ASIC or in the form of a software product stored on a carrier medium, adapted to be run by the OLT. The module should be adapted to cause forwarding of packets with unknown destination via broadcast GEM port(s) of the OLT. The module is preferably adapted to check whether the packet to be forwarded belongs to an ARP or a Broadcast type. If yes, existence of a destination address must not be specifically examined, since the type of the packet will define the type of forwarding.

It should be appreciated that other versions of the method and other embodiments of the OLT unit may be proposed; all those are to be considered part of the invention as far as being covered by the claims, which follow.

The invention claimed is:

1. A method of forwarding downstream packets in a GPON comprising an OLT unit having a physical PON port connected to N Optical Network Termination (ONT) units by optical fibers, while said physical PON port accommodates N individual virtual GEM ports respectively terminated with said N ONT units (ONTs) forming an N:1 group for a specific type of service, the method comprising:

assigning in said physical port of the OLT unit a virtual GEM port in addition to the individual GEM ports for said specific type of service, being an additional virtual GEM port which is terminated with and shared by all said N ONTs, and forwarding packets having unknown destination address, from said physical PON port downstream, only via a suitable said additional virtual GEM port.

2. The method according to claim 1, wherein the step of assigning said additional virtual GEM port comprises ensuring termination of the downstream packets, forwarded via it, at any one of said N ONT units.

3. The method according to claim 1, wherein said unknown destination address is a combination of VLAN-ID and Destination MAC address, being not yet included in a FIB table of the OLT unit.

4. The method according to claim 1, further comprising ensuring that said additional virtual GEM port is indicated by a unique GEM port ID agreed to be recognized by all said N ONT units.

5. An OLT unit for communication with a plurality of ONT units via optical fibers in a GPON; the OLT unit comprising: at least one physical PON port where N individual virtual GEM ports are configured for communicating packets between the OLT and N respective ONT units out of said plurality, forming an N:1 group for a specific type of service, and an additional virtual GEM port configured at said physical PON port, for said specific type of service to be delivered to said N ONT units, said additional virtual GEM port terminating with and being shared by all said N ONT units; wherein said physical PON port being adapted for downstream forwarding of packets with unknown destination addresses only via a suitable said additional virtual GEM port.

6. The OLT unit according to claim 5, wherein said additional virtual GEM port is indicated by a unique GEM port ID agreed to be recognized by all said N ONT units.

7. The OLT unit according to claim 5, further comprising a hardware and/or software module for configuring at least one said additional virtual GEM port in at least one said physical PON port, and for forwarding downstream packets with unknown destination addresses, and broadcast packets applied by the OLT unit to said physical PON port, only via a suitable shared broadcast GEM port.

8. A GPON network comprising the OLT unit according to claim 5.

9. A method for use in a Passive Optical Network (PON) for transmitting packets having unknown destination addresses from an Optical Line Termination (OLT) unit connected to a first plurality of Optical Network Terminals (ONTs), towards a second plurality of ONTs included in the first plurality of ONTs, the method comprising:
- providing in said OLT unit a plurality of ports, wherein each port out of said plurality of ports is adapted to perform encapsulation for transmitting frames interpretable by one ONT out of the first plurality of ONTs;
- assigning in said OLT unit one or more additional shared ports, wherein one shared port out of the one or more additional shared ports is adapted to perform encapsulation for transmitting frames interpretable by all of the ONTs of the second plurality of ONTs;
- forwarding a packet having unknown destination address towards said one shared port out of the one or more additional shared ports;
- encapsulating the packet having unknown destination address at said one shared port to obtain a shared frame which can be interpreted by all of the ONTs that belong to the second plurality of ONTs; and
- transmitting the shared frame towards all ONTs belonging to the second plurality of ONTs.

10. The method according to claim 9, wherein the second plurality of ONTs are associated with one type of a service, wherein a third plurality of ONTs from among the first plurality of ONTs are associated with a different type of a service, and wherein another shared port out of the one or more additional shared ports is adapted to perform encapsulation for transmitting frames interpretable by all ONTs belonging to the third plurality of ONTs.

11. The method according to claim 10, further comprising a step of determining, based on the type of service associated with the packet having unknown destination address to a shared port, which is the appropriate shared port towards which that packet should be forwarded.

12. The method according to claim 9, further comprising:
- associating the shared frame with a specific ID which indicates that the frame is a shared frame; and
- configuring each of the second plurality of ONTs not to drop packets having that specific ID.

13. An Optical Line Termination (OLT) unit adapted to operate in a GPON network by implementing the method of claim 9.

* * * * *